(12) United States Patent
Imai (10) Patent No.: US 7,259,386 B2
(45) Date of Patent: Aug. 21, 2007

(54) RADIATION IMAGE DETECTOR

(75) Inventor: Shinji Imai, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 45 days.

(21) Appl. No.: 10/843,629

(22) Filed: May 12, 2004

(65) Prior Publication Data
US 2004/0227114 A1    Nov. 18, 2004

(30) Foreign Application Priority Data
May 13, 2003   (JP) .............................. 2003-134833

(51) Int. Cl.
*G01N 23/04*    (2006.01)
(52) U.S. Cl. .................. 250/591; 250/580; 250/370.09
(58) Field of Classification Search ................ 250/591, 250/580, 370.09
See application file for complete search history.

(56) References Cited

U.S. PATENT DOCUMENTS

| | | | |
|---|---|---|---|
| 5,966,425 A * | 10/1999 | Beland | 378/108 |
| 6,243,441 B1 | 6/2001 | Zur | |
| 6,566,676 B1 * | 5/2003 | Kuwabara | 250/591 |
| 6,621,084 B1 * | 9/2003 | Wainer et al. | 250/370.09 |
| 6,707,059 B1 * | 3/2004 | Ogawa | 250/591 |
| 2003/0010923 A1 | 1/2003 | Zur | |
| 2003/0010942 A1 * | 1/2003 | Kuwabara | 250/580 |
| 2004/0026624 A1 * | 2/2004 | Wainer et al. | 250/370.09 |

FOREIGN PATENT DOCUMENTS

| | | | |
|---|---|---|---|
| EP | 1035421 A2 * | 9/2000 | |
| JP | 2000-284056 A | 10/2000 | |

* cited by examiner

*Primary Examiner*—Constantine Hannaher
*Assistant Examiner*—David S. Baker
(74) *Attorney, Agent, or Firm*—Sughrue Mion, PLLC (57) ABSTRACT

A radiation image detector that includes a radiation image recording medium capable of recording a radiation image and detects the signal outputted from the medium in accordance with the radiation image recorded on the medium, in which a real-time signal is obtaining with a simple and low-cost structure of the detector while the medium is being exposed to radiation. The charges generated in the photoconductive layer and stored in the storage section are detected by the first detecting section with the use of the first and second striped electrodes, each made of a plurality of wire electrodes, and the real-time signal while the medium is being exposed to radiation is obtained by the second detecting section connected to the second striped electrode by detecting the current flowing through the second striped electrode in accordance with the amount of charges generated in the photoconductive layer.

5 Claims, 6 Drawing Sheets

RADIATION IMAGE DETECTOR

BACKGROUND OF THE INVENTION

1. Field of the Invention

The present invention relates to a radiation image detector that includes a radiation image recording medium capable of recording a radiation image carried by radiation when exposed thereto and detects signals outputted from the medium in accordance with the radiation image recorded thereon. More specifically, it relates to a radiation image detector for detecting doses of radiation while the radiation image recording described above is being performed.

2. Description of the Related Art

A radiation image detector that includes a radiation image recording medium capable of recording a radiation image by storing electric charges into the storage section of the medium in accordance with the dose of radiation such as X-ray transmitted through-a subject and detects signals outputted from the medium in accordance with the radiation image recorded thereon is widely used including, for example, in obtaining medical radiation images, and various types of detectors are proposed.

One such detector is proposed as described, for example, in Japanese Unexamined Patent Publication No. 2000-284056. The radiation image detector described above has a radiation image recording medium comprising a set of layers layered in the order of a first electrode layer which is transparent to radiation; a recording photoconductive layer that generates charges when exposed to radiation; a charge transport layer that acts as substantially an insulator against the charges of latent image and as substantially a conductor for the transport charges having the opposite polarity to that of the charges of latent image; a reading photoconductive layer that generates electric charges when exposed to reading light; and a second electrode layer composed of first wire electrodes which are transparent to reading light and extending linearly, and second wire electrodes which are opaque to reading light and extending linearly, the first and second wire electrodes being disposed alternately in parallel with each other. In the radiation image detector described above, the radiation is emitted on the detector from the side of the first electrode, and the radiation image is recorded by storing electric charges of the latent image in accordance with the dose of radiation emitted thereon at the interface between the recording photoconductive layer and charge transport layer. Thereafter, the radiation image stored in the detector is read out as electrical signals by emitting reading light from the side of the second electrode and detecting the currents generated in the detector, that is, when the reading light is emitted on the detector, it passes through the first wire electrodes and illuminates the reading photoconductive layer generating charge pairs therein, and either negative or positive charges of the charge pairs couple with the charges of the latent image stored in the storage section, while the charges having the other polarity are detected by a current detecting amplifier connected to the first or second wire electrode, thereby the radiation image stored in the detector is read out as electrical signals.

Here, when obtaining a radiation image using the radiation image detector described above, the dose of radiation is controlled in accordance with the region of the human body to be imaged, the type of radiation source used, and the like, thereby the dose of radiation is controlled to an amount which is not harmful to human body, yet sufficient to obtain a radiation image of appropriate quality for diagnosis. In order to implement such dose control described above, the phototimer has conventionally been used. The phototimer is disposed between the radiation image detector and the subject to be imaged so that a gap is left therebetween. This gap causes the radiation image obtained by the radiation image detector to be enlarged, so that the size of the subject on the radiation image may differ from the actual size of the subject. This discrepancy in the size is undesirable in obtaining ordinary radiation images for medical diagnosis and making treatment plans using the radiation image other than the case in which the radiation image is enlarged intentionally. Further, the use of such radiation image for the geometrical measurement of the subject may cause inaccurate results. Still further, the phototimer is a device that compares the dose of radiation detected with a predetermined threshold level, and outputs a signal for terminating the radiation when the detected dose of radiation exceeds the threshold level. It has, however, different sensitivities to different radiation sources and their quality so that the threshold level needs to be adjusted according to the type of radiation source and its quality.

In this connection, certain methods for obtaining the signal for controlling the dose of radiation without using the aforementioned phototimer are proposed as described, for example, in U.S. Pat. No. 6,243,441 and U.S. Patent Laid-Open No. 20010806187. For example, U.S. Pat. No. 6,243,441 proposes a method for obtaining the dose control signal described above for the radiation image detector of so-called a direct conversion type that converts radiation image carried by radiation to electric charges using a photoconductive layer made of, for example, amorphous Selenium (a-Se) for detecting the radiation image, in which microplates, each corresponding to each pixel, for collecting the charges produced in the manner described above are divided into a real-time signal electrode for reading out the real-time signal corresponding to the charges generated in the photoconductive layer while it is being exposed to the radiation and a radiation image signal electrode for reading out the accumulated radiation image signal after the radiation image recording is completed, and the dose control signal for controlling the dose of radiation is outputted based on the real-time signal read out from the real-time signal electrode. U.S. Patent Laid-Open No. 20010806187 proposes a method for obtaining the dose control signal for the radiation image detector of direct conversion type as in the case described above, in which an electrostatic sensing electrode is provided separately, and the dose control signal is outputted based on the real-time signal detected by the electrostatic sensing electrode.

However, in the method in which the microplates provided on a pixel-by-pixel basis are divided as described in the U.S. Pat. No. 6,243,441, the structure of the detector becomes complicated and requires a greater number of interconnections, which requires a complicated manufacturing process and a higher manufacturing cost. Further, it has a switching circuit for switching the divided electrodes so that the image quality may be degraded due to the switching noise. The method described in U.S. Patent Laid-Open No. 20010806187 requires an electrostatic sensing electrode separately as described above, so that an additional cost for that is required. Further, the electrode is placed on the entrance side of the radiation so that the image of the electrode may easily be added to the radiation image. Mammographic images, in particular, are affected greatly by this added image of the electrode since they are usually obtained with a small dose of radiation.

SUMMARY OF THE INVENTION

In recognition of the circumstance described above, it is an object of the present invention to provide a radiation image detector that includes a radiation image recording medium capable of recording a radiation image carried by radiation when exposed thereto and detects the signal outputted from the medium in accordance with the radiation image recorded thereon, in which the real-time signal is obtained with a simple and low-cost structure provided therein while the medium is being exposed to radiation.

The radiation image detector of the present invention comprises a radiation image recording medium having a set of layers layered in the order of a first electrode layer which is transparent to radiation carrying a radiation image, a photoconductive layer that generates electric charges when exposed to the radiation transmitted through the first electrode layer, a storage section that stores the charges generated in the photoconductive layer, and a second electrode layer having a first striped electrode composed of a plurality of first wire electrodes disposed in parallel at predetermined intervals and a second striped electrode composed of a plurality of second wire electrodes disposed between the first wire electrodes; a first detecting section connected to the first striped electrode and detects the charges stored in the storage section using the first and second striped electrodes; and a second detecting section connected to the second striped electrode and detects the current flowing through the second striped electrode in accordance with the amount of charges generated in the photoconductive layer.

Here, the radiation image recording medium described above may be any type of radiation image recording medium as long as it has the aforementioned layers layered in the manner described above, and the term "radiation image recording medium" as used herein includes radiation image recording media having other layers layered between the layers described above.

The second striped electrode of the radiation image detector described above may comprise a plurality of comb electrodes, each composed of a plurality of partial electrodes made by cutting the second wire electrodes at predetermined intervals in the longitudinal direction and connected in the arranging direction of the second wire electrodes, and the second detecting section may comprise a plurality of current detecting sections, each connected to each of the plurality of comb electrodes respectively.

Here, the term "cutting the second wire electrodes at predetermined intervals in the longitudinal direction" means cutting the second wire electrodes by predetermined lengths in the longitudinal direction and the respective partial electrodes may be of the same or different lengths.

The radiation image detector of the present invention comprises the radiation image recording medium described above and the charges stored in the storage section are detected by the first detecting section using the first and second striped electrodes of the second electrode layer, and the current flowing through the second striped electrode in accordance with the amount of charges generated in the photoconductive layer is detected by the second detecting section connected to the second striped electrode. Thus, the real-time signal generated in the radiation image recording medium while it is being exposed to radiation maybe obtained with the simple and low-cost structure of the detector, and the use of the real-time signal so obtained allows appropriate dose control.

Further, when the second striped electrode of the radiation image detector described above is composed of a plurality of comb electrodes, each composed of a plurality of partial electrodes made by cutting the second wire electrodes at predetermined intervals in the longitudinal direction and connected in the arranging direction of the second wire electrodes, and the second detecting section is composed of a plurality of current detecting sections, each connected to each of the plurality of comb electrodes respectively, the real-time signal may be obtained from each section of the radiation image recording medium provided with the comb electrode described above, so that the real-time signal may be obtained from an appropriate section of the recording medium based on the shape of the subject being imaged, thereby more appropriate dose control may be realized.

DESCRIPTION OF THE PREFERRED EMBODIMENTS

Figure 1:
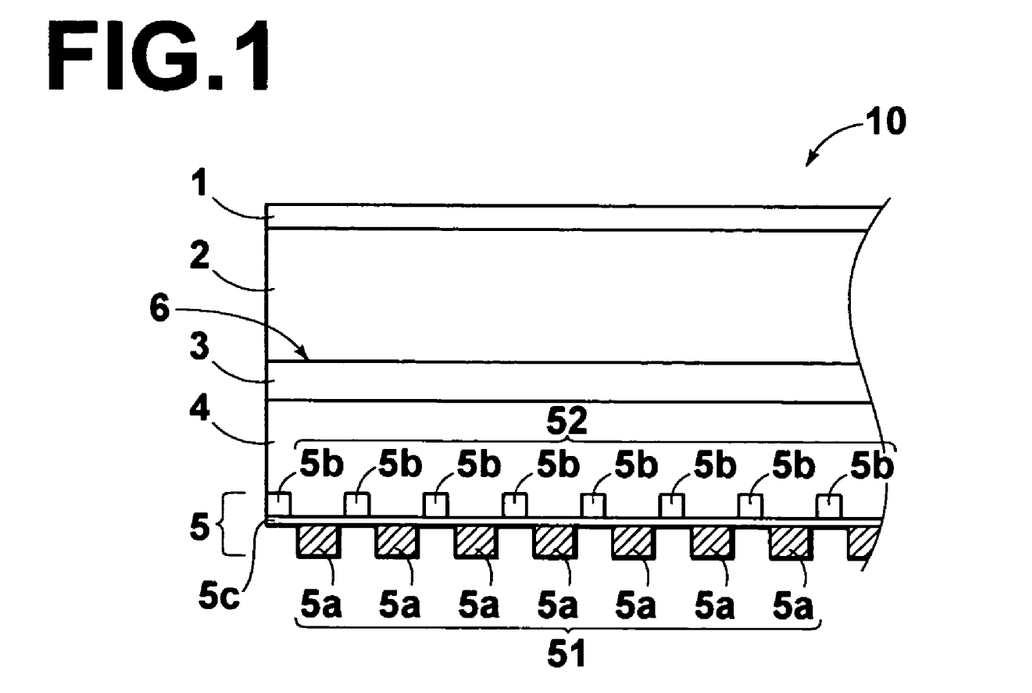
FIG. 1 is a partial cross-sectional view of a radiation image recording medium of the radiation image detector according to an embodiment of the present invention.

Hereinafter, the radiation image detector according to an embodiment of the present invention will be described in detail with reference to the accompanying drawings. The radiation image detector described above comprises a radiation image recording medium for recording a radiation image; a first detecting section for detecting a radiation image signal from the radiation image recording medium based on the radiation image recorded therein; and a second detecting section for detecting a real-time signal generated in the radiation image recording medium while it is being exposed to radiation. FIG. 1 is a schematic diagram of the radiation image recording medium of the radiation image detector according to an embodiment of the present invention.

As shown in FIG. 1, the radiation image recording medium 10 of the radiation image detector according to the embodiment comprises a set of layers layered in the order of a first electrode layer 1 which is transparent to radiation carrying a radiation image; a recording photoconductive layer 2 that generates electric charges when exposed to the radiation transmitted through the first electrode layer; a charge transport layer 3 that acts as an insulator against the charges generated in the photoconductive layer 2 and as a conductor for transport charges having the opposite polarity to that of the charges generated in the photoconductive layer 2; a reading photoconductive layer 4 that generates electric charges when exposed to reading light; and a second electrode layer 5 which is transparent to the reading light. A storage section 6 for storing the charges generated in the recording photoconductive layer 2 is formed between the recording photoconductive layer 2 and charge transport layer 3.

The first electrode layer 1 may be made of any material as long as it is capable of transmitting radiation. It may be made of, for example, Nesa film ($SnO_2$), ITO (Indium Tin Oxide), IDIXO (Idemitsu Indium X-metal Oxide: Idemitsu Kosan Co. Ltd.) which is an optically transparent amorphous oxide film, or the like of 50 to 200 nm thickness. In addition, Al or Au of 100 nm thickness may also be used as the first electrode layer 1.

The second electrode layer 5 comprises a first striped electrode 51 composed of a plurality of first wire electrodes 5a and a second striped electrode 52 composed of a plurality of second wire electrodes 5b disposed between the first wire electrodes 5a of the first striped electrode 51. An insulation layer 5c which is transparent to reading light is provided between the first and second striped electrodes. In the embodiment, the first striped electrode 51 is made of a metal such as Al, Cr, or the like which is opaque to the reading light. The second striped electrode 52 is transparent to the reading light and may be made of a similar material used for the first electrode layer 1. The first striped electrode 51 may be made first using the similar material of the second striped electrode 52, and then coating it with a metal, such as Al or Cr, to make it opaque to the reading light. In the embodiment, the first striped electrode 51 is made to be opaque to the reading light and the second striped electrode is made to be transparent to the reading light as described above. But the arrangement of the striped electrodes is not limited to this; and it may be that the first striped electrode 51 is made to be transparent to the reading light as described above, and the second striped electrode 52 is made to be opaque to the reading light, first and second striped electrodes 51 and 52 are made to be opaque to the reading light and the reading light may be transmitted through the gap between the respective wire electrodes, or the first and second striped electrodes 51 and 52 are made to be transparent to the reading light.

Figure 2:
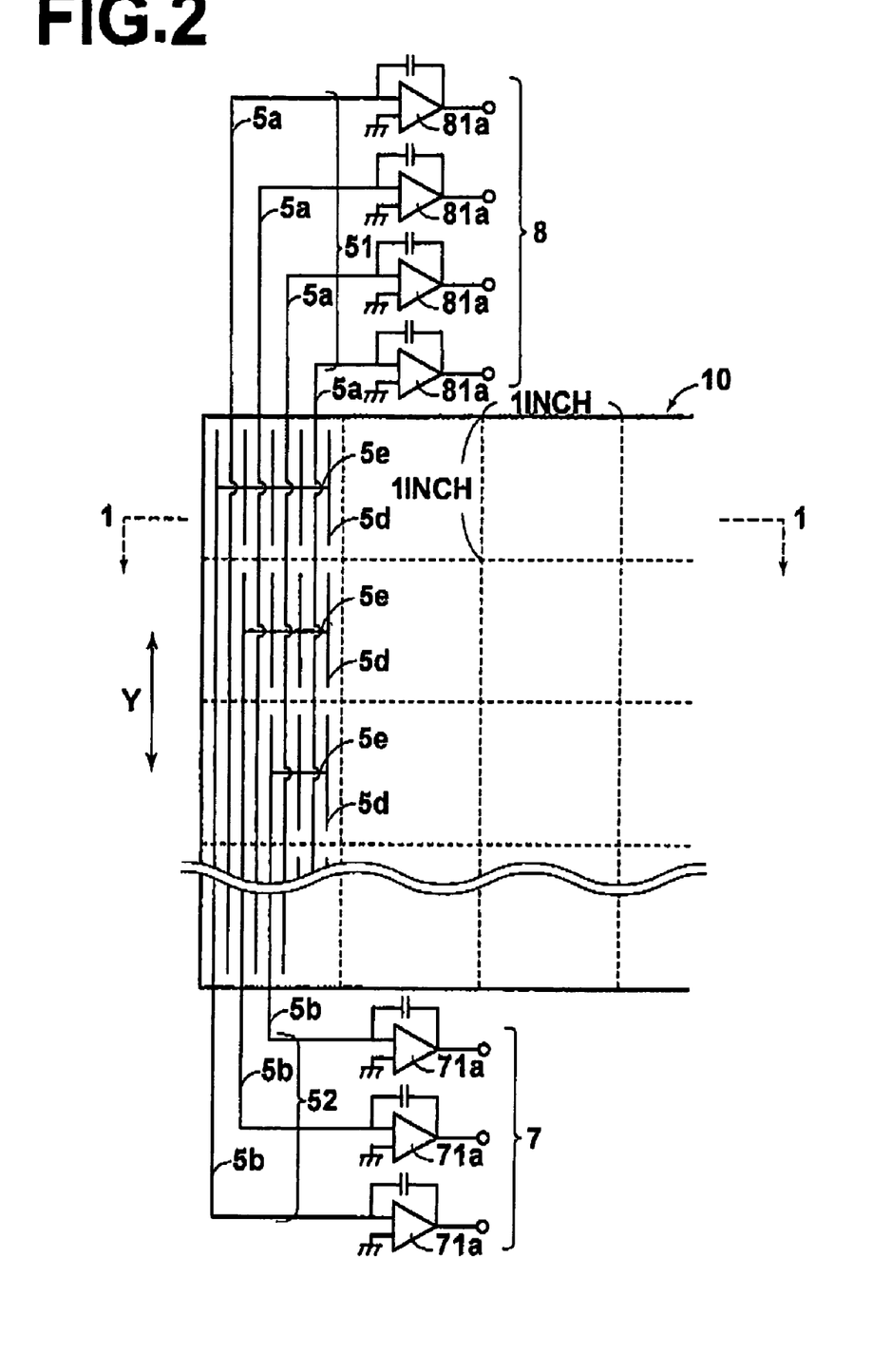
FIG. 2 is a drawing illustrating a bottom view of the radiation image recording medium shown in FIG. 1, and the first and second detecting sections of the radiation image detector according to an embodiment of the present invention.

FIG. 2 is a bottom view of the radiation image recording medium 10 shown in FIG. 1. As can be seen, FIG. 1 is a cross-sectional view of the radiation image recording medium 10 taken along the line 1-1 in FIG. 2.

As shown in FIG. 2, the second striped electrode 52 comprises a comb electrode 5e composed of a plurality of partial electrodes 5d made by cutting the wire electrodes 5b at predetermined pitches in the longitudinal direction (Y direction) and connected in the arranging direction. In the embodiment, the respective wire electrodes 5b are cut and connected in the arranging direction such that the comb electrode 5e is provided for every section of one inch square. Each of the comb electrodes 5e is connected to the corresponding current detecting amplifier 71a of a second detecting section 7 which will be described hereinafter. FIG. 2 shows only a portion of the radiation image detector 10, and the rest of the detector is omitted for clarity.

The recording photoconductive layer 2 may be made of any material as long as it is capable of generating electric charges when exposed to radiation. In the embodiment, a-Se-based layer having high quantum efficiency and dark resistance is used as the recording photoconductive layer 2. Preferably, the thickness of the layer is about 500 μm.

As for the charge transport layer 3, it is more preferable, for example, if it has a greater difference in charge mobility between the charges charged on the first electrode layer 1 and those having the opposite polarity (for example, not less than $10^2$, more preferably, not less than $10^3$), and materials such as poly N-vinylcarbazole (PVK), organic compounds including N,N-diphenyl-N,N-bis(3-methylphenyl)-[1,1'-biphenyl]-4,4'-diamine(TPD), discotic liquid crystal, and the like, or semiconductor materials such as TPD-dispersed polymers (polycarbonate, polystyrene, PVK), a-Se doped with 10 to 200 ppm of Cl, and the like may be preferably used for the charge transport layer 3.

The reading photoconductive layer 4 may be made of any material as long as it is capable of taking on conductivity when exposed to the reading light. For example, a photoconductive material containing at least one such material as, for example, a-Se, Se—Te, Se—As—Te, nonmetal phthalocyanine, metal phthalocyanine, MgPc (Magnesium phthalocyanie), VoPc (phase II of Vanadyl phthalocyanine), CuPc (Cupper phthalocyanine) as the primary component may be preferably used. Preferably, the thickness of the reading photoconductive layer 4 is about 10 μm.

As shown in FIG. 2, the radiation image detector according to the embodiment has a first detecting section 8 for detecting the charges stored in a storage section 6 of the radiation image recording medium 10, and a second detecting section 7 for detecting a real-time signal while the recording medium 10 is being exposed to radiation. The second detecting section 7 detects the current flowing through the second striped electrode 5b in accordance with the amount of charges generated in the recording photoconductive layer 2 while it is being exposed to radiation. The first detecting section 8 comprises a plurality of current detecting amplifiers 81a, each connected to each of the wire electrodes 5a of the first striped electrode 51 respectively. The second detecting section 7 comprises a plurality of current detecting amplifiers 71a, each connected to each of the wire electrodes 5b of the second striped electrode 52 respectively.

The operation of the radiation image detector according to the embodiment will be described. First, the operation of the detector at the time of obtaining the real-time signal while it is being exposed to radiation will be described.

Figure 3A:
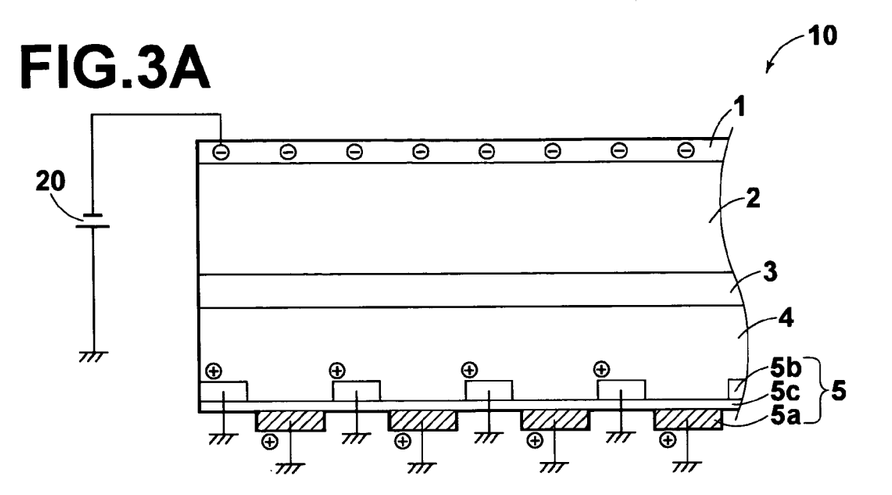
FIG. 3A is a drawing illustrating the operation of the radiation image detector according to an embodiment of the present invention in detecting the real-time signal generated in the radiation image recording medium while it is being exposed to the radiation.

When a radiation image is recorded, the second electrode layer 5 is grounded and a negative high voltage is applied to the first electrode layer 1 from a high voltage power source 20 to negatively charge the first electrode layer 1 and positively charge the second electrode layer 5 as shown in FIG. 3A. Then, each of the second wire electrodes 5b of the second electrode layer 5 is connected to the corresponding current detecting amplifier 71a of the second detecting section 7, and the radiation transmitted through a subject 30 is emitted on the radiation image recording medium 10. The shaded area of the subject 30 is an opaque section 30a that blocks radiation and the non-shaded area is a transparent section 30b that transmits the radiation.

Figure 3B:
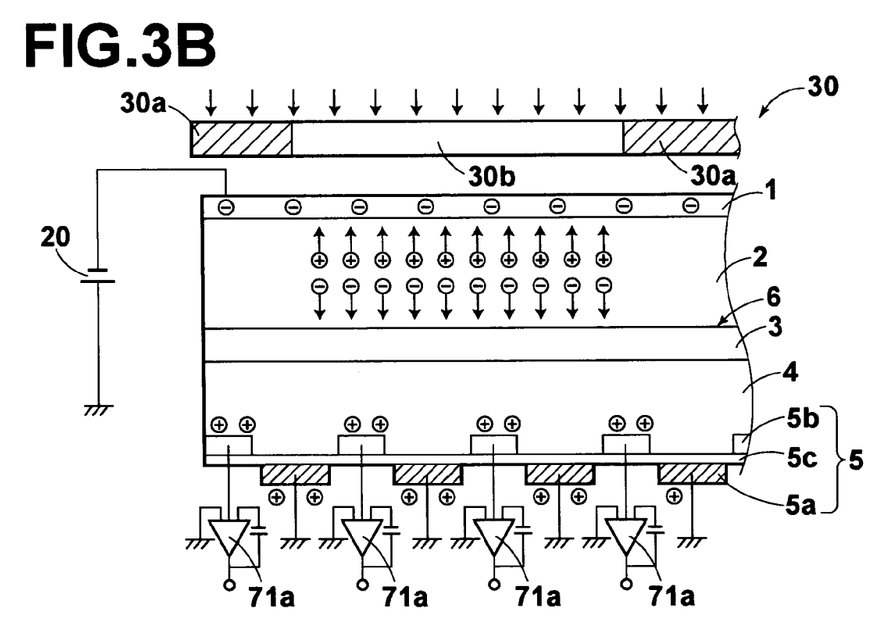
FIG. 3B is a drawing illustrating the operation of the radiation image detector according to an embodiment of the present invention in detecting the real-time signal generated in the radiation image recording medium while it is being exposed to the radiation.

The radiation emitted on the radiation image recording medium 10 in the manner described above passes through the first electrode layer 1 and illuminates the recording photoconductive layer 2. Then, charge pairs are generated in the area of the recording photoconductive layer 2 exposed to the radiation as shown in FIG. 3B, and the positive charges of the charge pairs move to the negatively charged first electrode layer 1 where they couple with the negative charges and disappear. In the mean time, the negative charges of the charge pairs generated in the manner described above move toward the positively charged second electrode layer 5 and stored into a storage section 6, which is an interface between the recording photoconductive layer 2 and the charge transport layer 3, since the charge transport layer 3 acts as an insulator against the negative charges.

Here, when the charge pairs are generated in the recording photoconductive layer 2 when exposed to the radiation and the negative charges of the charge pairs are stored into the storage section 6 as described above, the amount of positive charges charged on the second electrode layer 5 increases in accordance with the amount of the negative charges generated. The amount of the negative charges stored in the storage section 6 in the manner described above is proportional to the dose of radiation so that the increased amount of the positive charges charged on the second electrode layer 5 is also proportional to the dose of radiation. Therefore, the current flowing through the second striped electrode 52 in accordance with the dose of radiation may be detected by connecting the current detecting amplifier 71a to the second wire electrode 5b of the second electrode layer 5 as shown in FIG. 3B. Thus, the amount of current detected by the current detecting amplifier 71a is proportional to the dose of radiation. That is, the dose of radiation emitted on the radiation image recording medium 10 may be monitored by monitoring the currents by the current detecting amplifier 71a as described above.

Figure 4:
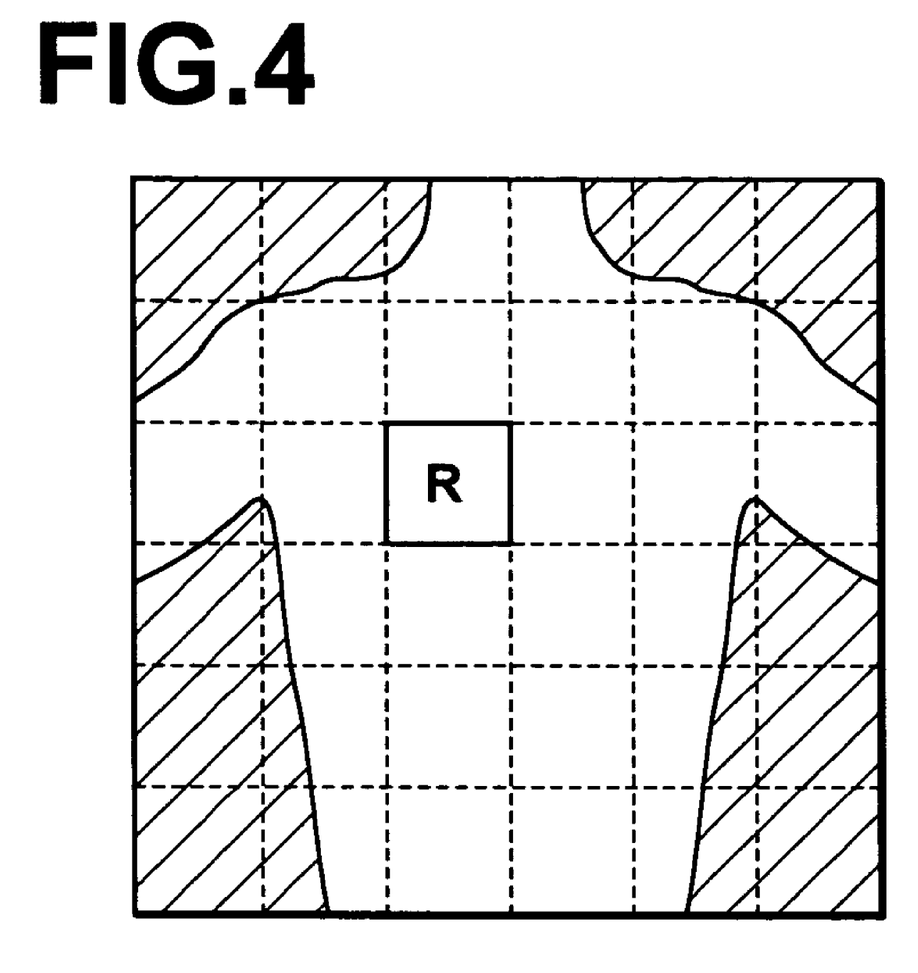
FIG. 4 is a drawing illustrating a mode of the radiation image detector according to an embodiment of the present invention in which the real-time signal is detected from a section of the detector.

Further, the second striped electrode 52 is composed of a plurality of comb electrodes 5e, each connected to each of the current detecting amplifiers 71a respectively as shown in FIG. 2, so that the radiation image detector of the embodiment may detect a dose of radiation for each section of the detector having the comb electrode 5e. Accordingly, when obtaining a radiation chest image as shown in FIG. 4, for example, irradiation control of the radiation may be implemented by detecting the real-time signal detected by the comb electrode 5e provided in the area indicated by R in FIG. 4.

Next, the operation of the detector in reading out the radiation image recorded in the radiation image recording medium 10 in the aforementioned manner will be described.

Figure 5A:
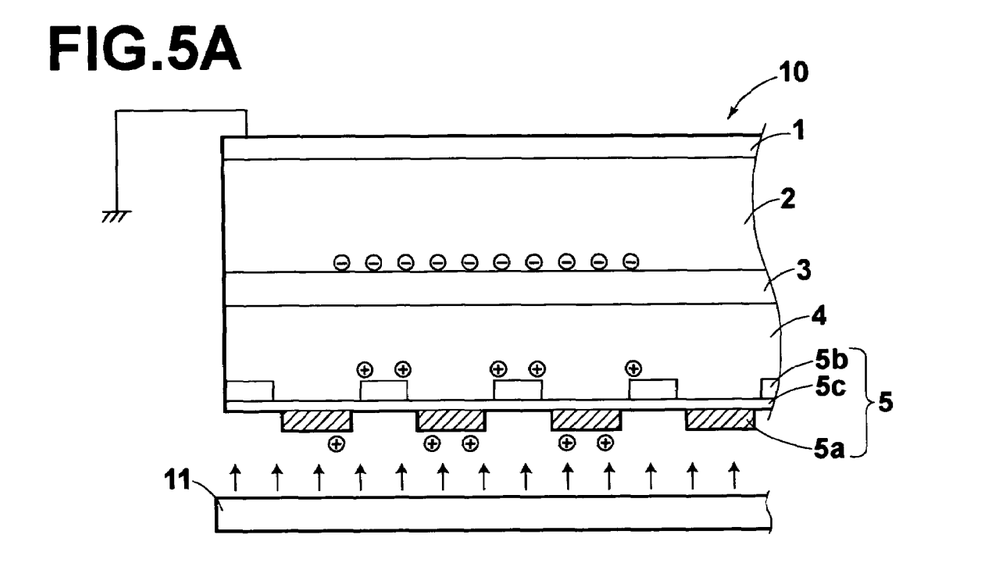
FIG. 5A is a drawing illustrating the operation of the radiation image detector according to an embodiment of the present invention in reading out the radiation image recorded on the detector.
Figure 5B:
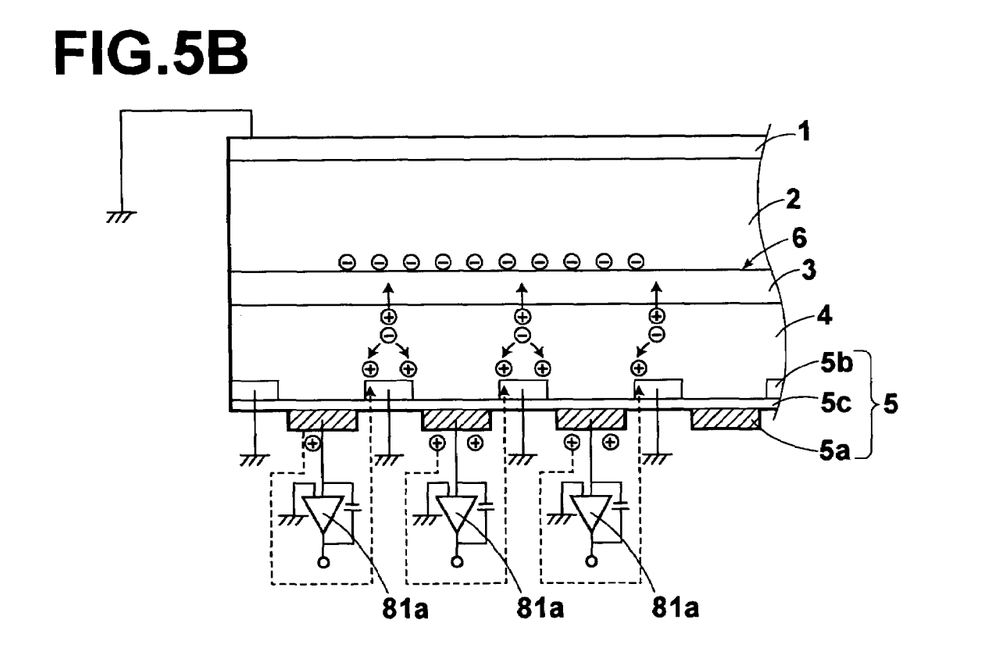
FIG. 5B is a drawing illustrating the operation of the radiation image detector according to an embodiment of the present invention in reading out the radiation image recorded on the detector.
Figure 6:
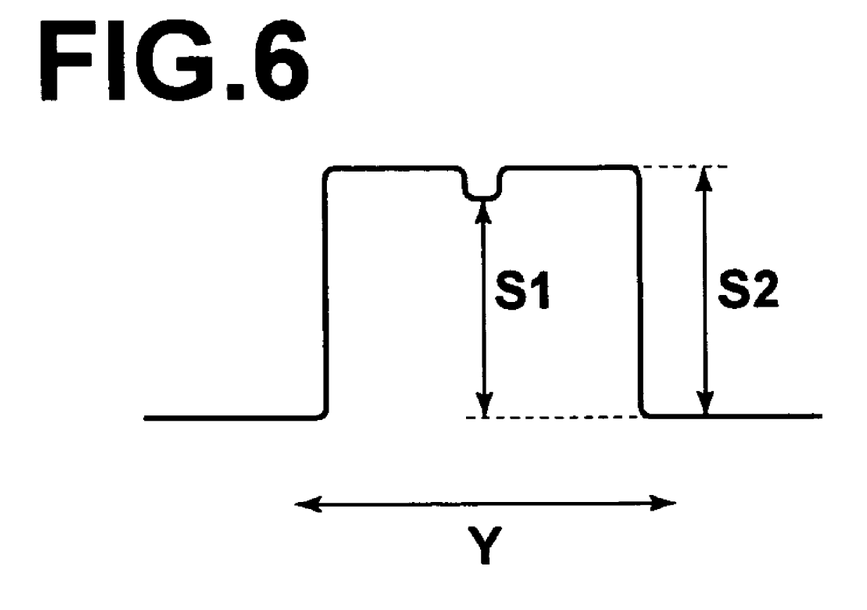
FIG. 6 is a drawing illustrating a portion of the radiation image signal detected by the radiation image detector according to an embodiment of the present invention.

When reading out the radiation image recorded in the radiation image recording medium 10, the first electrode layer 1 is grounded as shown in FIG. 5A. Then, a reading light source 11 extending linearly in the direction substantially perpendicular to the longitudinal direction of the first and second wire electrodes 5a and 5b is conveyed in the longitudinal direction of the first and second wire electrodes 5a and 5b to sequentially emit the linear reading light on the second electrode layer 5 as shown in FIG. 5A. When the reading light is emitted sequentially on the second electrode layer 5 as described above, the second wire electrodes 5b of the second electrode layer 5 are grounded, and each of the first wire electrodes 5a is connected to the corresponding current detecting amplifier 81a of the first detecting section 8. When reading light is emitted under the condition described above, it passes through the second wire electrodes 5b and illuminates the reading photoconductive layer 4. When the reading light is emitted on the reading photoconductive layer 4 in the aforementioned manner, charge pairs are generated therein, and the positive charges of the charge pairs pass through the charge transport layer 3 and couple with the negative charges stored in the storage section 6 formed at the interface between the charge transport layer 3 and the recording photoconductive layer 2, and disappear. In the mean time, the negative charges of the charge pairs generated in the reading photoconductive layer 4 move to the positive charges charged on the second wire electrodes of the second electrode layer 5. Then, they couple with the positive charges charged on the first wire electrodes 5a through the current detecting amplifiers 81a, as well as with the charges charged on the second wire electrode 5b. By emitting the reading light and discharging the charges stored in the storage section 6 in the aforementioned manner, the signal corresponding to the charges stored in the storage section, that is, the radiation image signal corresponding to the dose of radiation emitted on the radiation image recording medium 10 may be detected.

Figure 7:
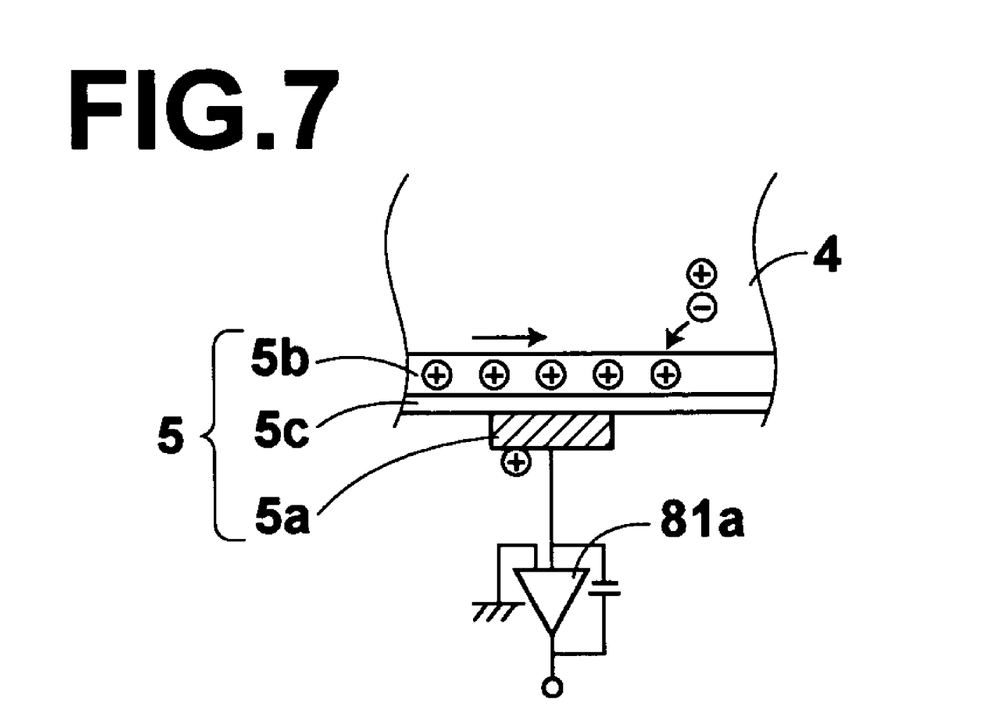
FIG. 7 is a drawing illustrating the operation of a comb electrode in reading out the radiation image recorded on the radiation image detector according to an embodiment of the present invention.

In the radiation image recording medium 10 according to the embodiment of the present invention, the second wire electrode 5b is cut at predetermined pitches as shown in FIG. 2, so that the aforementioned discharging does not occur at the point where the electrode is discontinued and the signal level S1 of the scanned line that includes the spot of the discontinued electrode becomes somewhat lower when compared with the signal level S2 of the adjacent lines. Also, at the portion corresponding to the wire connecting the partial electrodes 5d of the comb electrode 5e in the arranging direction, the discharging described above may occur, but the positive charges charged on the wire described above are coupled with the negative charges generated in the reading photoconductive layer 4 and discharged as shown in FIG. 7, so that the coupling of the charges charged on the first wire electrode 5a with the negative charges and discharging through the current detecting amplifier 81a as described above do not take place, resulting in somewhat a lower level of the scanned line that includes the portion corresponding to the wire described above when compared with the adjacent scanned lines as in the case described above. The drop in the signal level described above, however, is very small and does not have any significant impact on the detection of the radiation image signal. Further, the spot where the drop in the signal level is observed as described above may be plotted in coordinates, and an impaired signal level may be corrected using the normal signal levels of adjacent coordinates of the impaired signal level when, for example, implementing impairment corrections for the radiation image signal.

In the embodiment of the present invention, the second striped electrode 52 is composed of a plurality of comb electrodes 5e, but it is not necessarily limited to this, and other configuration designs may be employed for the first and second striped electrodes 51 and 52 as long as either of them may be used for detecting the radiation image signal and the other for detecting the real-time signal.

Further, the layer structure of the radiation image recording medium of the radiation image detector of the present invention is not limited to that described in the embodiment, and other layers, for example, maybe added thereto. In effect, any layer design or material may be used for the radiation image recording medium as long as it is capable of generating electric charges when exposed to radiation, storing the charges therein, and outputting the charges stored therein through the first and second electrode layers.

What is claimed is:

1. A radiation image detector comprising:
a radiation image recording medium having a set of layers layered in the order of a first electrode layer which is transparent to radiation carrying a radiation image, a photoconductive layer that generates electric charges when exposed to the radiation transmitted through said first electrode layer, a storage section that stores said charges generated in said photoconductive layer, and a second electrode layer having a first striped electrode composed of a plurality of first wire electrodes disposed in parallel at predetermined intervals, and a second striped electrode composed of a plurality of second wire electrodes disposed between said first wire electrodes;
a first detecting section connected to said first striped electrode and detects said charges stored in said storage section using said first and second striped electrodes; and
a second detecting section, which is connected to said second striped electrode, that detects the current flowing through said second striped electrode in accordance with the amount of said charges being generated in said photoconductive layer while the radiation image detector is being irradiated with radiation.

2. The radiation image detector according to claim 1, wherein said first and second detecting sections each comprise a current detecting amplifier.

3. The radiation image detector according to claim 1, wherein said second striped electrode comprises a plurality of comb electrodes, each composed of a plurality of partial electrodes made by cutting said second wire electrodes at predetermined intervals in the longitudinal direction and connected in the arranging direction of said second wire electrodes, and said second detecting section comprises a plurality of current detecting sections, each connected to each of said plurality of comb electrodes respectively.

4. The radiation image detector according to claim 3, wherein said first and second detecting sections each comprise a current detecting amplifier.

5. The radiation image detector according to claim 1, wherein the second detector is configured to provide real time radiation dose control.

* * * * *